(12) United States Patent
Downing et al.

(10) Patent No.: US 6,571,692 B1
(45) Date of Patent: Jun. 3, 2003

(54) HEATING OF CALENDER ROLL SURFACES

(75) Inventors: Daniel Ray Downing, Uniontown, OH (US); David Thomas Reese, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/831,772

(22) PCT Filed: Dec. 30, 1998

(86) PCT No.: PCT/US98/27727
§ 371 (c)(1),
(2), (4) Date: May 9, 2001

(87) PCT Pub. No.: WO00/40798
PCT Pub. Date: Jul. 13, 2000

(51) Int. Cl.[7] ................................................ B30B 15/34
(52) U.S. Cl. ........................................ 100/38; 100/329
(58) Field of Search ............................ 100/35, 327, 38, 100/329, 332, 92; 492/46; 219/619, 469; 165/89

(56) References Cited

U.S. PATENT DOCUMENTS

| | | | |
|---|---|---|---|
| 3,702,912 A | 11/1972 | Greenberger | ............ 219/10.61 |
| 4,384,514 A | 5/1983 | Larivé et al. | ................. 100/38 |
| 4,573,402 A * | 3/1986 | Sharma et al. | .......... 100/162 B |
| 4,621,177 A | 11/1986 | Pulkowski et al. | ... 219/10.49 A |
| 4,775,773 A | 10/1988 | Verkasalo | ............ 219/10.61 R |
| 4,823,688 A | 4/1989 | Wedel et al. | ................. 100/93 |
| 4,948,466 A | 8/1990 | Jaakkola | ..................... 162/207 |
| 5,074,019 A | 12/1991 | Link | .......................... 29/116.2 |
| 5,111,564 A | 5/1992 | Pav et al. | ................... 29/116.2 |
| 5,123,340 A | 6/1992 | Kiema et al. | ........... 100/93 RP |
| 5,513,560 A | 5/1996 | Downing et al. | ............. 100/35 |
| 5,571,066 A | 11/1996 | Kayser | ........................ 492/46 |
| 5,762,740 A | 6/1998 | Benzing, II et al. | ......... 156/133 |

FOREIGN PATENT DOCUMENTS

DE          3107709        8/1982        ............ D21G/1/00

* cited by examiner

Primary Examiner—Allen Ostrager
Assistant Examiner—Jimmy T Nguyen
(74) Attorney, Agent, or Firm—Nancy T. Krawczyk

(57) ABSTRACT

A method and apparatus for rapid heating of calender rolls 350, 352 for a calendering apparatus 200 is disclosed. At a heating area 800, the rolls 350, 352 are preheated, reheated, or maintained at any temperature prior to the rolls 350, 352 being placed into the calendering apparatus 300. The preferred method of heating is by induction heating. The rolls 350, 352 may be delivered to the heating apparatus 802 from an initial storage area 420 or the calendering apparatus 300. The rolls 350, 352 are transported by an overhead transfer mechanism 400. The disclosed method and apparatus greatly facilitate formation of multi-layered laminates and is particularly useful in the tire building art.

3 Claims, 6 Drawing Sheets

HEATING OF CALENDER ROLL SURFACES

TECHNICAL FIELD

The disclosed invention relates to a unique method and apparatus for heating calender rolls in a calender roll system where the rolls are readily changeable. The disclosed heating is particularly suitable in the method for forming tire components of predetermined cross sections.

BACKGROUND ART

Conventional heating methods for calender rolls include hot water steam heating and electrical resistance heating. However, with such conventional heating methods, the heating of the entire roll requires a substantial length of time.

Induction heating of rolls is also known in the art. With induction heating, heating of the roll can be both selective and rapid. Induction heaters are typically classified by the frequency of the induced current. Low-frequency heaters usually induce power frequency current in the charge. A medium-frequency induction heater induces currents of frequencies between 180 and 540 hertz while a high-frequency heater induces currents of frequencies from 1000 hertz and upwards.

U.S. Pat. No. 5,571,066 discloses heating the ends of a calendering roll. An external electromagnetic induction system heats the entire working surface of the roll while an internal electric-resistance heating system heats the roll from internally. In normal operation, only the external heating system is active. The internal heating system must be used to bring the roll up to the required operating temperature.

U.S. Pat. No. 5,123,340 discloses induction heating of softcalender and supercalender rolls. The rolls are provided with a thermally conductive coating.

U.S. Pat. No. 5,111,564 discloses two induction heating coils at the opposing ends of a roll. The induction heating compliments the hydraulic heating of the median portion of the roll.

U.S. Pat. No. 5,074,019 discloses the use of high frequency induction heating coils inside and outside of a calender roll. A number of coils are uniformly distributed the length of the entire roll. For uniform heating, a corresponding bank of induction heating coils is may be arranged along the outside length of the roll.

Almost all of the above mentioned prior art patents are concerned with increasing the roll diameter by a miniscule amount to effect a papermaking process. The prior art references fail to teach heating of a calendering roll at a separate location from the calendering process wherein at least one of the calender rolls is occasionally replaced with another roll for operation within the calendering process.

U.S. Pat. Nos. 5,513,560 and 5,762,740, both incorporated herein by reference, disclose a quick change over method and apparatus for a calendering apparatus 200. The disclosed apparatus 200 is used to form a laminate from a series of tire components, forming a tire casing. Each calender assembly 302 includes two calender rolls 350, 352, as seen in FIG. 7. The rolls 350, 352 are delivered to the assembly 302 by an overhead moveable transfer mechanism 400.

During operation of the calendering process, the calender rolls 350, 352 can be internally heated or cooled. The heating means 335 has a resistive heating element which enters through an opening in the hubs 314 or 316. The internal heating elements 335 are employed when the material being processed can be more efficiently applied in a heated environment.

While heating means are sufficient to internally heat the rolls 350, 352, greater efficiency of the calendering process is achieved when the rolls 350, 352 are heated prior to the roll delivery into the calender assembly 302.

The present invention is directed toward an improvement in the quick change over calendering apparatus. Prior to placement of the rolls 350, 352 in a calender assembly 302, the rolls 350, 352 are heated at a heating station. Heating the rolls 350, 352 prior to placement in the calender assembly 302 permits rapid start-up of the calendering operation, instead of waiting for the rolls to be heated by the formally disclosed internal heating means. The internal heating means may be used to maintain the roll temperature.

At the heating station, induction heating is the preferred method of heating. Induction heating provides almost instantaneous heating of the rolls, and is a more efficient method of heating.

SUMMARY OF THE INVENTION

This invention is an improved method of calendering a material. The material is calendered by at least one calender roll, the roll operating at a predetermined operating temperature. The calender rolls are replaced from time to time with another roll. Prior to placing the new roll into its calendering position within the calendering apparatus, the replacement roll is heated, using a heat source, from a temperature lower than the operating temperature. The preferred predetermined operating temperature ranges from 180° to 260° F.

The material may be calendered by a pair of associated rolls and replaced by another pair of associated rolls.

The preferred method of heating the calender rolls is by induction heating. The induction heating coil is preferably operated at a frequency range of 7 to 11 kHz.

The disclosed method of heating the calender rolls may also be used to reheat rolls which have been removed from the calendering position within the calendering apparatus.

The disclosed heating station also permits the rolls that are being heated prior to placement within the calendering apparatus, or rolls that are being reheated, to be held at any temperature for a period of time. When holding the roll for a period of time after heating the roll, the roll temperature may be constant after reaching the desired temperature or may be variable if the roll is heated to a temperature greater than the operating temperature and allowed to cool to the operating temperature during the holding period.

BRIEF DESCRIPTION OF DRAWINGS

The invention will be described by way of example and with reference to the accompanying drawings in which.

DETAILED DESCRIPTION OF THE INVENTION

Figure 1:
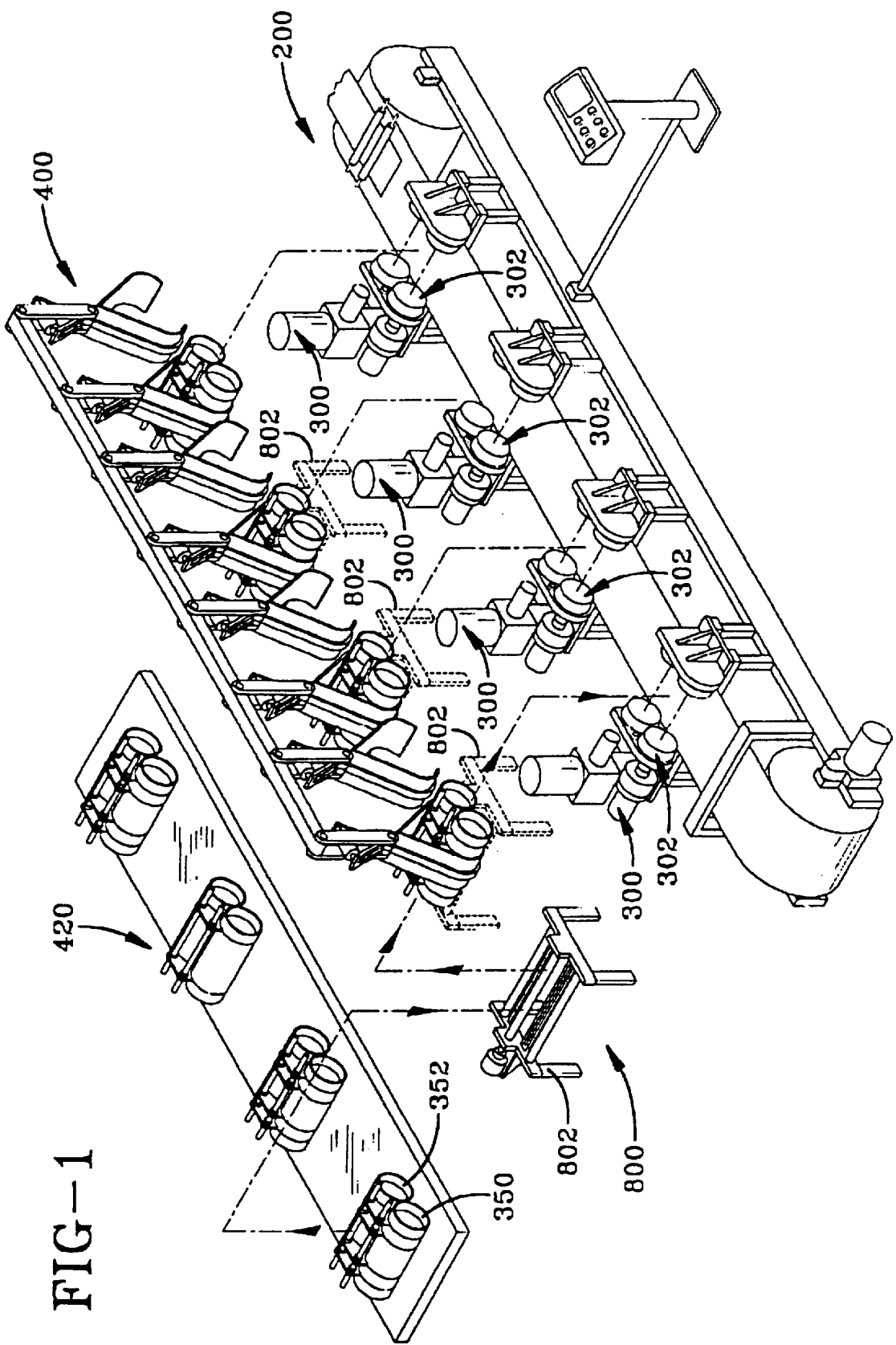
FIG. 1 illustrates an overview of the quick changeover calender apparatus.

FIG. 1 illustrates an overview of the quick changeover calender apparatus. As disclosed in U.S. Pat. Nos. 5,513,560 and 5,762,740, the apparatus 200 is used to form a laminate from a series of components, the method being particularly useful for forming a tire casing from a plurality of tire components. The tire casing forming apparatus 200 is a plurality of calender apparatuses 300. Each calender assembly 302 includes two calender rolls 350, 352. At each calender apparatus 300, the laminate is calendered to a predetermined configuration by the calender rolls 350, 352. The calender rolls 350, 352 are delivered to the assembly 302 by an overhead moveable transfer mechanism 400 from an initial roll staging area 420. The transfer mechanism 400 enables the rolls 350, 352 to be removed from the calender apparatus 300 and exchanged with other calender rolls with different profile configurations when it is desired to form laminates with different predetermined configurations of either the overall laminate configuration or individual components of the laminate. For a greater discussion of the differing profiles of the calender rolls 350, 352, the calendering apparatus 300 and the overhead transfer mechanism 400, reference is made to U.S. Pat. Nos. 5,513,560 and 5,762,740.

During formation of the laminate from a series of components, the formation process may benefit from the calender rolls 350, 352 being heated. The calender rolls 350, 352 may be internally heated, as previously noted. The previously disclosed method and apparatus is improved by the inclusion of the heating area 800, located between the roll staging area 420 and the tire component forming apparatus 200.

The heating area 800 is a plurality of heating stages 802, each station preferably corresponding to a calender apparatus 300 in the tire component forming apparatus 200. There may be fewer heating stages if at a certain location in the calendering process it is determined that external heating of the roll surface is not desired. The series of heating stages 802 may be joined by a frame extending from the first heating stage to the last stage (not illustrated).

Figure 2:
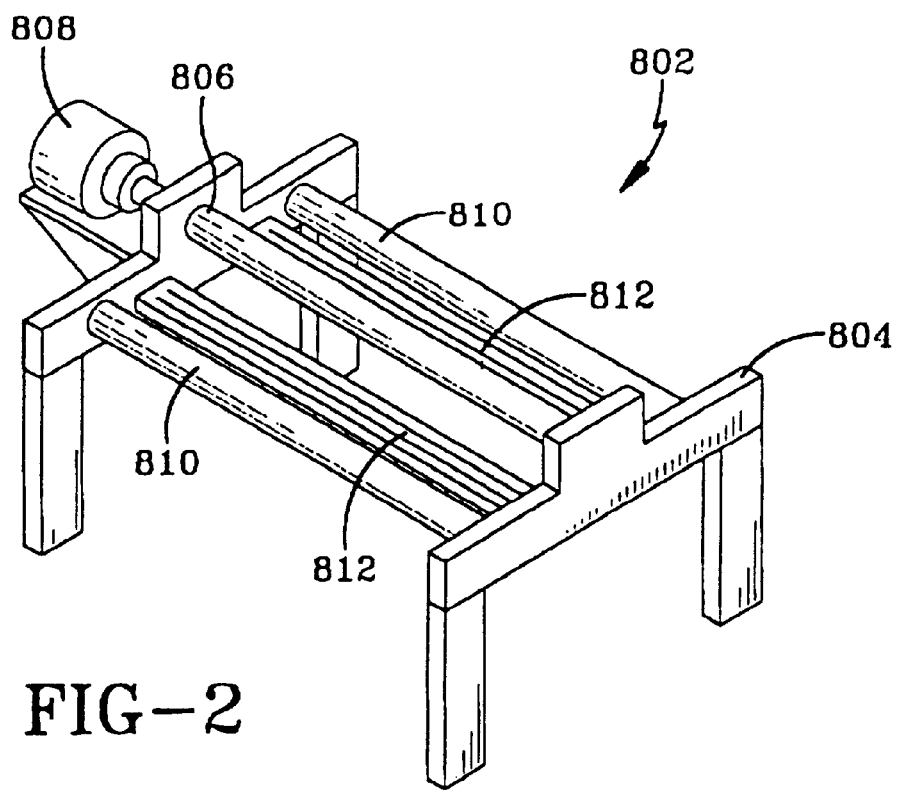
FIG. 2 illustrates a single heating stage.

A single heating stage 802, without the calender rolls 350, 352 to be heated thereupon, is illustrated in FIG. 2. The heating stage 802 has a frame structure 804. Traversing the heating stage 802 is a drive roll 806. The drive roll 806 is driven by the motor 808. At opposing sides of the stage 802 are a pair of idle rolls 810. Each idle roll 810 is mounted to permit free rotation of the roll 810. Between each idle roll 810 and the drive roll 806 is a heating means 812. The heating means 812 extend substantially the length of the stage 802, generally corresponding to the length of the idle rolls 810. The heating means 812 preferably employ induction heating coils 814 which extend substantially the full length of the heating means 812.

Figure 3:
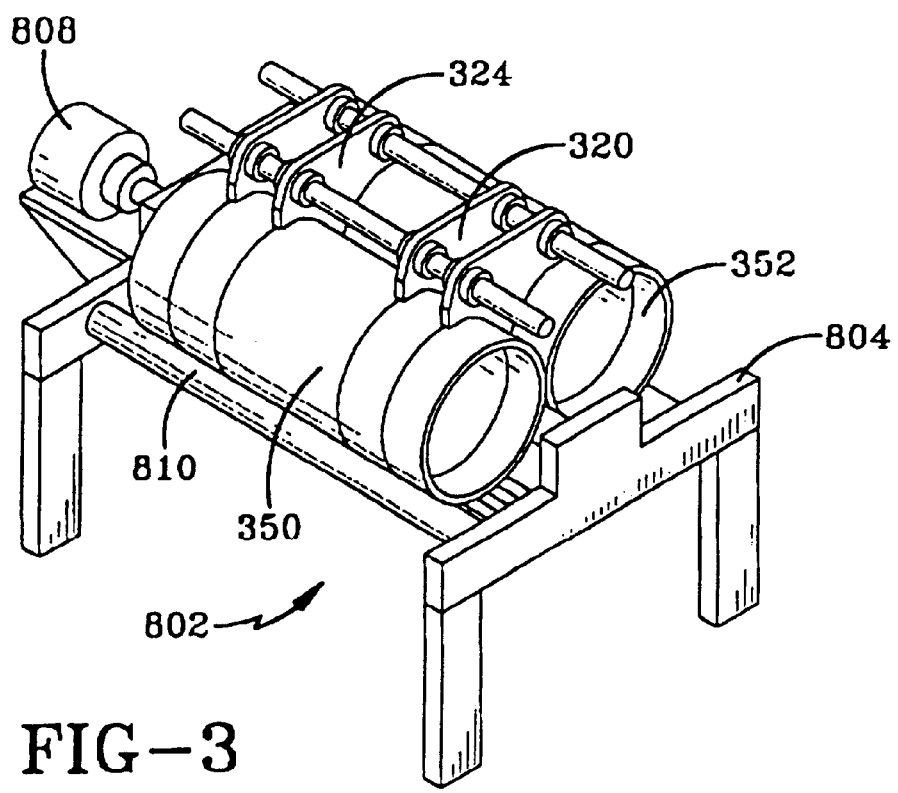
FIG. 3 illustrates a heating stage with a pair of calender rolls thereon.

The calender rolls 350, 352 are delivered to the heating stage 802 by the overhead moveable transfer mechanism 400. The rolls 350, 352 may be paired together with at least one pair of plows 320 laterally positioned at predetermined locations radially above the pair of calender rolls 350, 352. See FIG. 3. Each plow 320 has a pair of rigid members 324 contoured to precisely fit above and between the two rolls 350, 352. The plows 320 secure and provide lateral support to the rolls 350, 352 while preventing an overflow of calendered material while forming the tire casing at the tire component forming apparatus 300.

Figure 4:
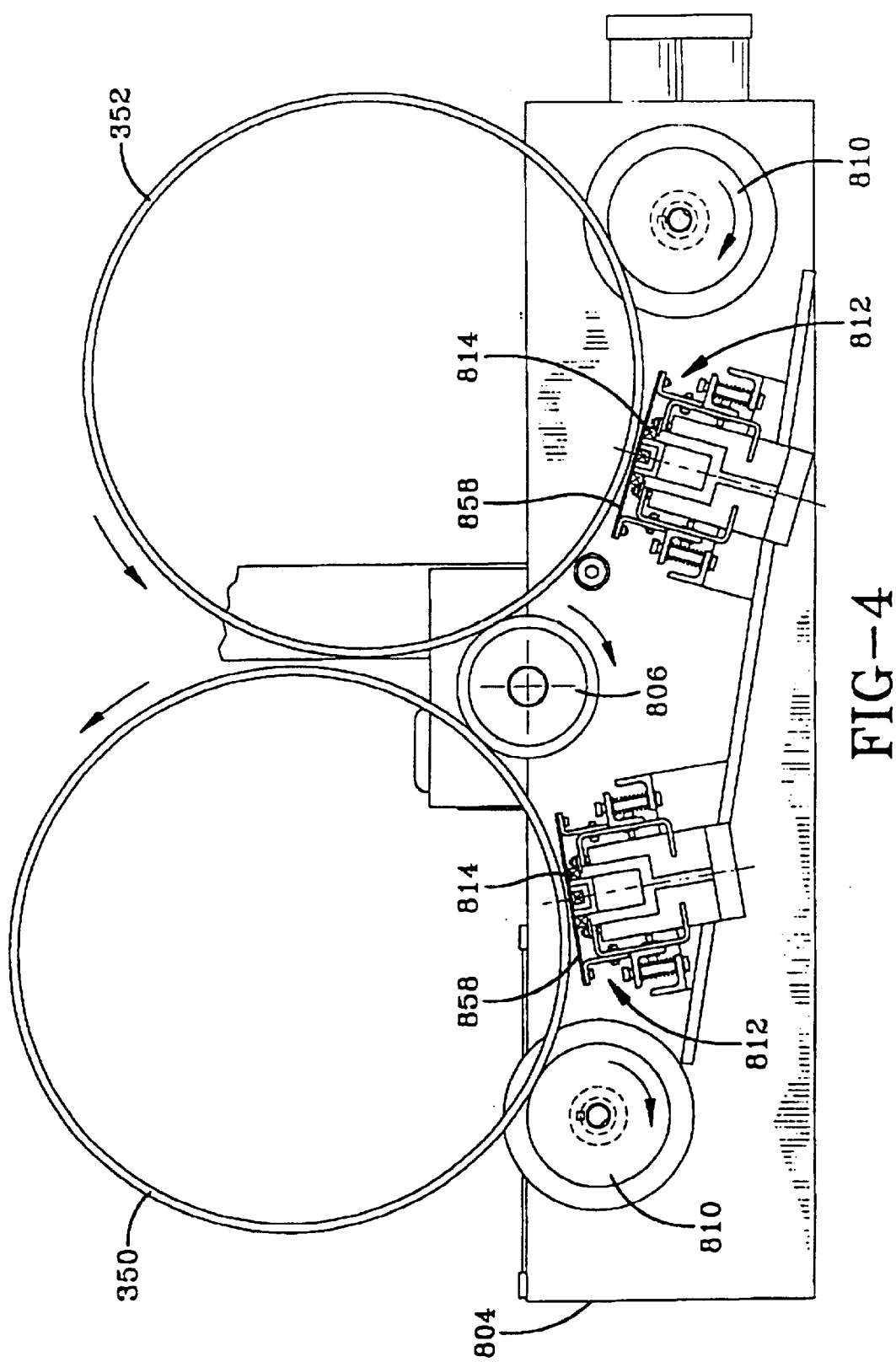
FIG. 4 is a cross-sectional view of FIG. 3.

When the calender rolls 350, 352 are placed onto the heating stage 802, each roll 350, 352 contacts the drive roll 806 and one idle roll 810, as illustrated in FIG. 4. As the drive roll 806 rotates in the direction illustrated by the direction arrow, each calender roll 350, 352 rotates in the opposing direction, as indicated. Due to the point of contact, the idle rolls 810 rotate in the same direction as the drive roll 806, as indicated.

The calender rolls 350, 352 are in close proximity to the heating means 812. The heating source 812 may be positioned within the frame 804 at an inclination angle, as illustrated, in order to provide for the close proximity of the heating source 812 to the rolls 350, 352. Each roll 350, 352 is associated with a single heating source 812.

The preferred final temperatures of the rolls 350, 352 is from about 140° to about 260° F. (60° to 126° C.). The initial temperature of the rolls 350, 352 may vary from a room temperature to the final temperature; that is the initial roll temperatures 60 to 260° F. (15° to 126° C.). While the majority of the rolls being heated in the heating stage 802 will be at about room temperature, the rolls may also be delivered to the heating stage 802 from the tire component forming apparatus 300 to reheat, adjust, or maintain the temperature of the rolls.

Temperature sensors are mounted on the heating frame 804 near the rolls 350, 352 to determine the roll temperature. This data is provided to a controller (not illustrated) to factor into the heating cycle of the heating means and the roll speed. The surface speed of the rolls 350, 352 also plays a role in the heating process. The speed at which each roll 350, 352, 806, 810 turns determines the amount of time that a portion of the roll 350, 352 dwells in the heating field generated by the heating means 812. For this reason, a roll speed feedback device is also employed to provide the speed data to the controller.

The type of heating that may be employed include induction heating, dielectric, and radiant heating means. Dielectric heating may be accomplished by forming the rolls 350, 352 from a nominally insulating material and subjecting the rolls 350, 352 to an alternating electrical field. The dielectric heater operates at a frequency above 10 megahertz.

As noted above, the preferred method of heating is by induction heating coils 814. As the rolls 350, 352 are rotated, the surface of each roll 350, 352 will continually pass through the induction field generated by the associated induction coil 814. For induction heating, the gap between each heating means 812 and the associated roll 350 or 352, at the smallest distance, ranges from 1/16" to 1/2" (1.58 to 12.70 mm), with a preferred spacing of 5/32" (3.97 mm). If the gap is too great, the heating efficiency of the induction coils 814 is reduced.

Figure 5:
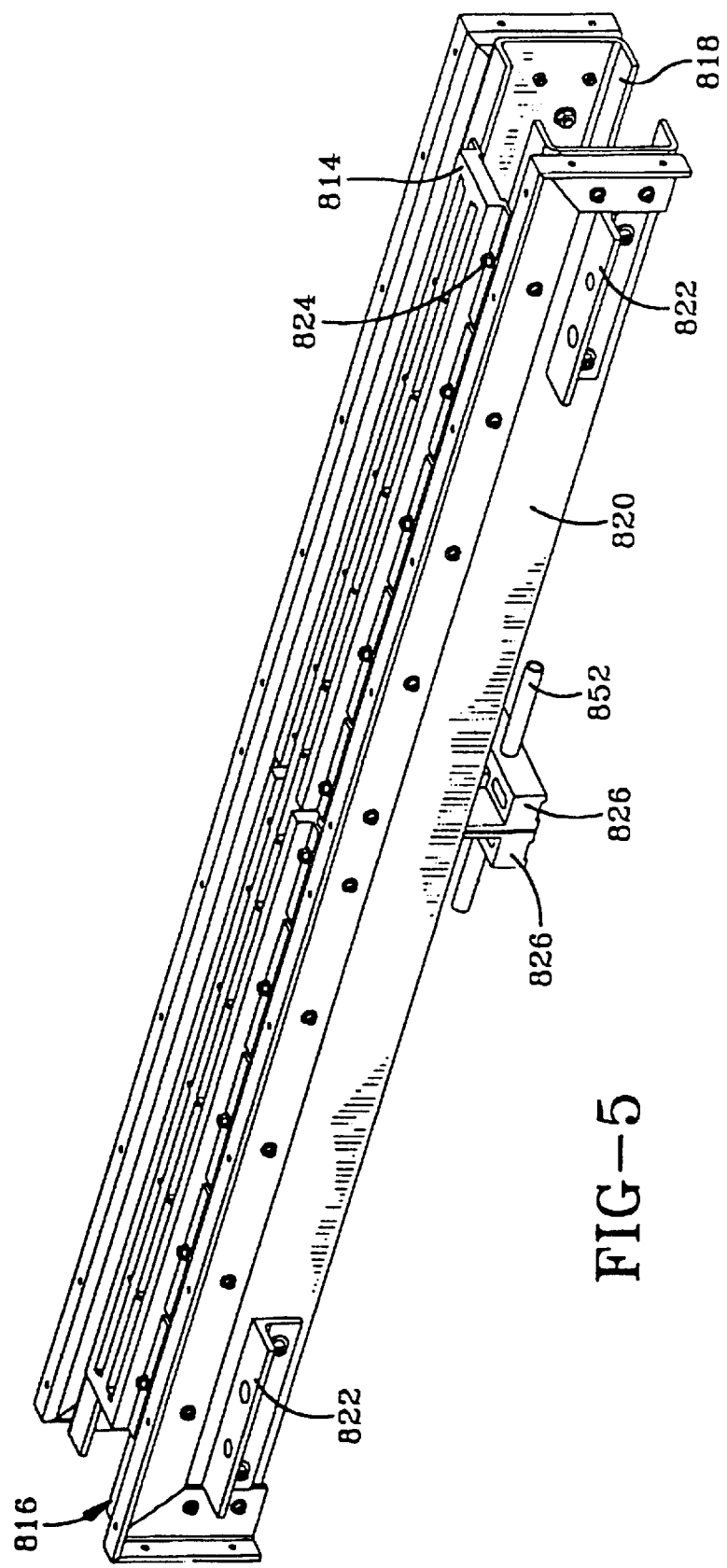
FIG. 5 illustrates the induction heating coil.
Figure 6:
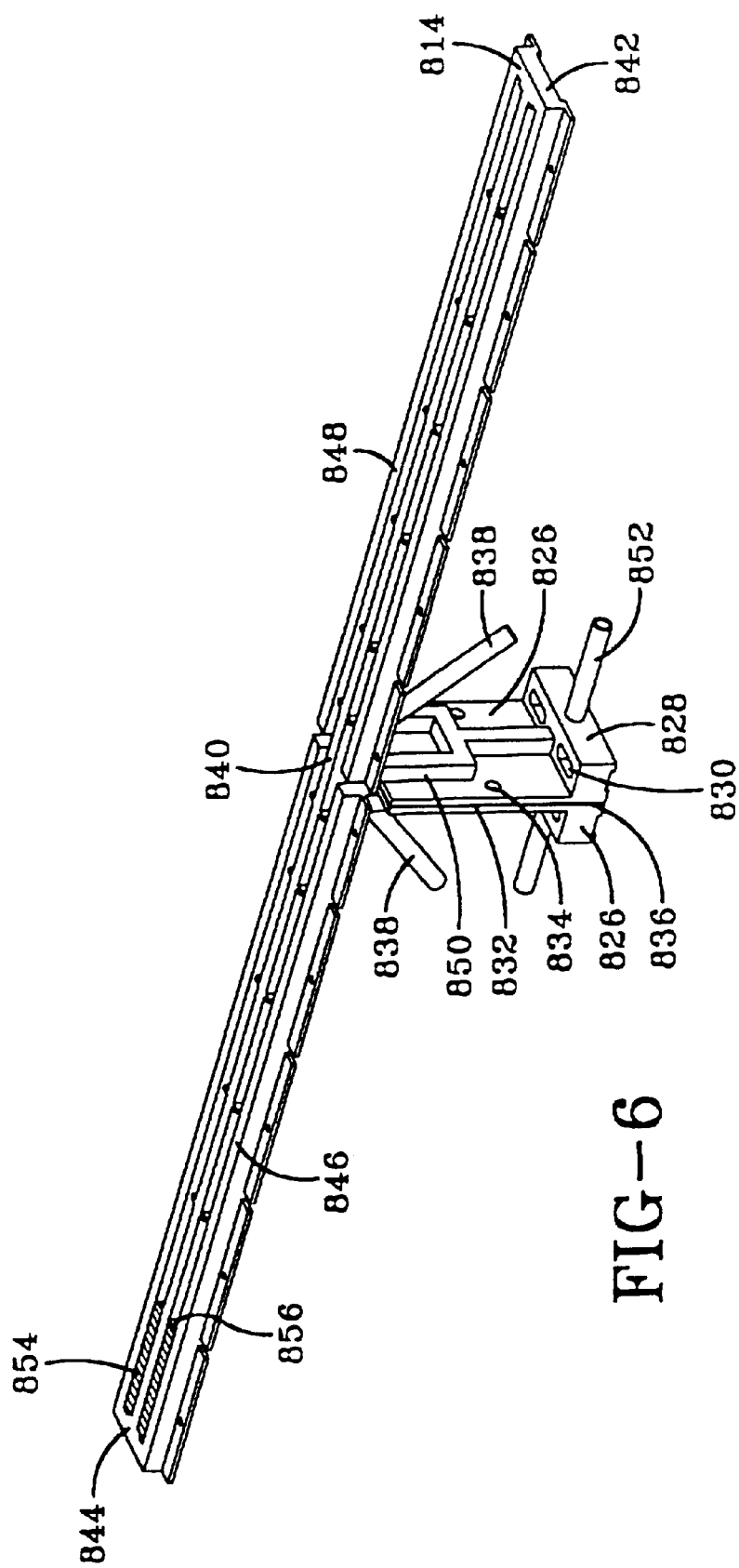
FIG. 6 illustrates the induction heating coil, without the main bracing.
Figure 7:
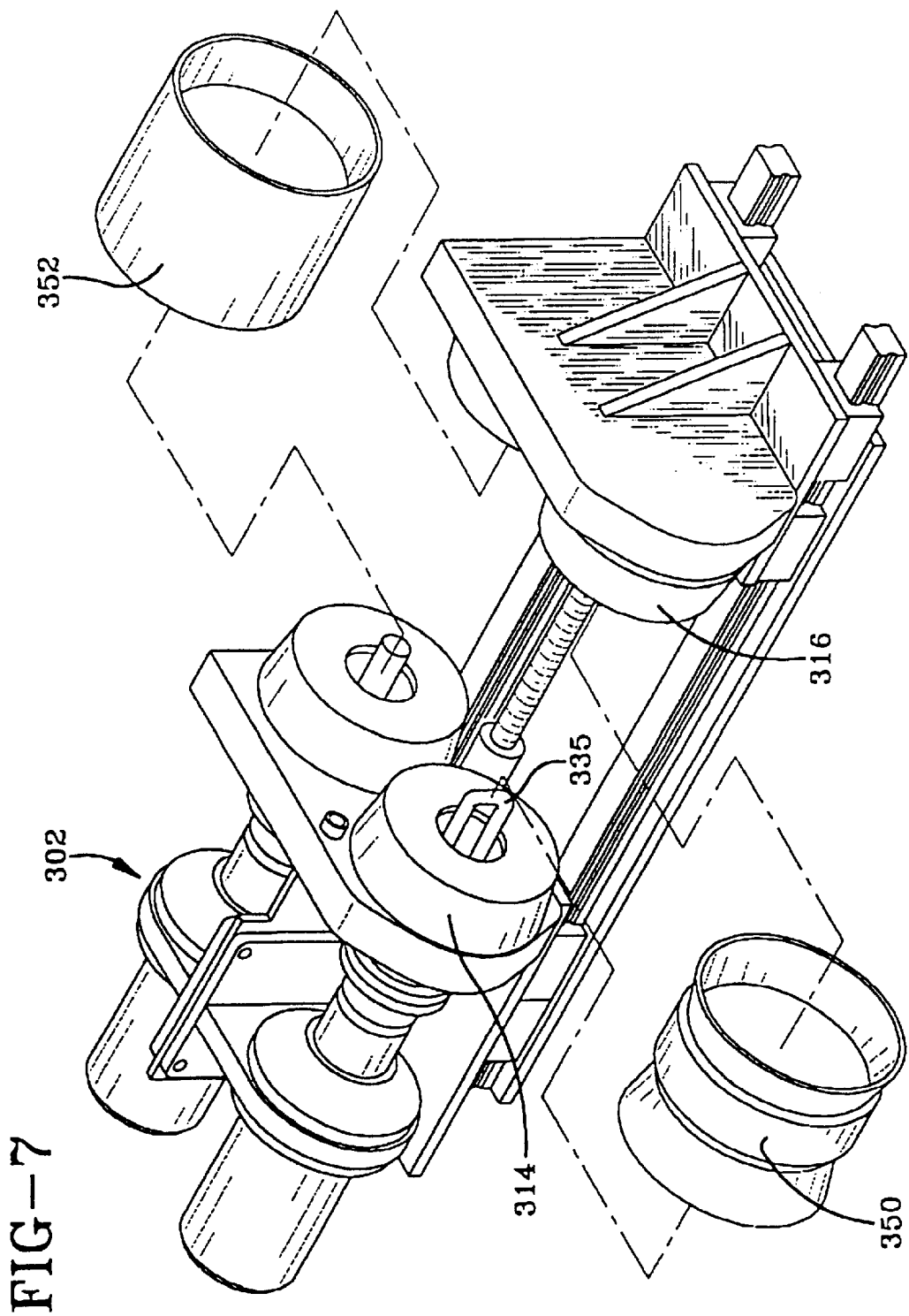
FIG. 7 illustrates a calender assembly.

The preferred induction heating means 812 are more fully illustrated in FIGS. 5 and 6. The induction coil 814 is of the type conventionally known as a split return pancake coil due to its single sided heating and preferably formed from square copper tubing. The induction coil 814 is supported by a set of support bracings 816. Each bracing 816 includes a main bracing 818 and an angle bracing 820. Brackets 822 may also be employed for mounting. The induction coil 814 is secured to the angle bracing 820 by a plurality of brass fittings 824. Other conventional mounting means may be employed. The primary requirement is that the mounting means be made of nonconductive insulating materials.

The coil 814 is mounted on a pair of copper plates 826. Each copper plate 826 is L-shaped. The small leg 828 of the L-shaped plate has means 830 for mounting onto the power supply. The long leg 832 of the L-shaped plate has means 834 to secure the two plates together. In between the two plates is a TEFLON separator 836. The separator 836 acts to keep the positive and negatively charged plates 826 separate. The plates 826 and separator 836 are secured by nylon nut and bolt fittings.

Extending from the underside of the coil 814, adjacent each copper plate 826, is the inlet 838 for the a coolant, typically distilled water, but other conventional coolants may be used, which travels through the induction coil 814. The coolant travels in both directions along the center leg 840 of the coil, splits at the opposing ends 842, 844, and back along the outside legs 846, 848 of the coil. The coolant exits through the tong-shaped tube 850 and exits though the outlet leg 852. Similar to the coil 814, the tong-shaped tube 850, as well as the inlet 838 and outlet 852 are copper tubing. Preferably, the inlet 838 and outlet 852 are round tubing as illustrated, but may also be square tubing. During operation of the induction coil 814, because the induction coil 814 is internally cooled with the recirculating coolant, the coil 814 does not see appreciable heat buildup.

The current flow through the induction coil 814 travels in an opposing path through the coil 814. The current flows through one copper plate 826, along the outside coil legs 846, 848, joins at a first coil end 842 or 844, down the center leg 840, splits at the opposing end 844 or 842, and through the remaining legs 846, 848, and into the other copper plate 826. Because the current passing through the coil is alternating (AC), the path of the current reverses itself each cycle.

To force the current flowing along the center leg 840 of the coil 814 to generate a greater induction field above the coil 814, a plurality of flux concentrators 854 are stacked along the undersides of the center leg. The concentrators 854 are illustrated only in one portion of the coil 814; however, concentrators 854 are placed along the full length of the coil 814. The concentrators 854 increase the heating efficiency of the disclosed system. The concentrators 854, of a conventionally known material, are thin, unshaped members. The concentrators 854 fill the spaces between the extending pegs 856 spaced along the center leg 840. For increased efficiency of induction field, at approximately every ¼" (approx. 6.35 mm), an insulation piece, with the same shape as the flux concentrators, is placed amongst the flux concentrators 854. The insulation pieces break up any current attempting to travel through the flux concentrators 854. Without the insulation, the concentrators 854 would tend to unnecessarily heat up, using energy that could otherwise be transmitted to the rolls 350, 352.

For protection, a cover 858 may be applied to the top of the heating means 812, as illustrated in FIG. 4. The cover 858 is secured to the bracings 820.

The power wattage and its frequency is varied by the controllers, in order to vary the frequency and wattage provided to the coils. The wattage controls the amount of heat being generated in the rolls 350, 352. The frequency of the power to the coil 814 controls the depth of the heat generation. At relatively high frequencies, most of the heat will be induced at or near the outside surface of the rolls 350, 352. At lower frequencies, the heat will penetrate deeper in the rolls 350, 352. Typically, the use of higher frequencies provide more efficient heating to the rolls 350, 352. For this reason, the disclosed system operates at relatively high frequencies with a narrow air gap between the roll and coil face.

For the disclosed invention, the frequency is within the range of 1 kHz to 20 kHz, preferably 7–11 kHz. If the frequency employed is too low, an audible noise highly disturbing to persons nearby is generated. During operation of the induction coil 814, at the preferred frequency range for the induction coil 814, the roll 350 or 352 is heated to a limited depth of the roll 350 or 352. The remainder of the roll 350 or 352 is heated by means of traditional conduction as the heat that was induced conducts deeper into the roll 350 or 352. The combination of the induction heating and the conduction heating optimizes the energy consumption of the heating station 802 and takes advantage of the roll material.

With the disclosed induction heating means, the entire mass of a 1300 lb. (2866 kg) roll may be heated from a room temperature of approximately 70° F. (21° C.) to about 200° F. (93° C.) in about 3 minutes. This is a very rapid heating compared to the internal heaters previously disclosed; internal heating of the same 1300 lb. roll to the same temperature would take approximately 20 minutes.

Employing the heating stages 802 disclosed herein provides for improved efficiency of the calendering process and also permits greater flexibility in the calendering process. By placing rolls 350, 352 into the calendering apparatuses, the calendering process may begin as soon as the rolls 350, 352 are secured instead of waiting for the internal heaters 335 to bring the rolls 350, 352 up to the desired operating temperatures. Once the heated rolls 350, 352 are placed into the calendering apparatus 302, in accordance with the present invention, the internal heaters 335 may be used to maintain the roll temperature.

The heating stage 802 also allows for faster changeovers in the laminate specifications or repairs to the calendering apparatus 302. When it is desired to change the laminate specifications, rolls with a different defined profile may be delivered to the heating station 802 and heated to either the desired operating temperature or greater than the desired temperature. If the temperature is greater than the operating temperature, the roll may then be held while it cools to the desired temperature. This may be desired, for example, if for some reason the plurality of calendering apparatus 302 are changed out serially, instead of in parallel. With a serial changeover, all of the rolls 350, 352 may be heated and then held, with the last roll to be changed out heated to a greater temperature since it may have a longer hold period before being put into the associated calendering apparatus.

Also, as stated, if repairs are needed to the calendering apparatus 302, or a material change is to be accomplished, the rolls 350, 352 may be transferred back to the heating stage 804 and then heated/reheated and then held at the operating temperature while the desired repair or material change is carried out. Other circumstances may occur which may precipitate placing the rolls 350, 352 into the heating stage 804 for reheating or maintaining a temperature. For whatever circumstances may arise, the ability to have the rolls 350, 352 at a temperature that allows for almost instantaneous operation of the calendering apparatus 302 once all of the desired rolls 350, 352 are in place increases the efficiency of the apparatus 200, leading to less down time of the process, and reduced manufacturing costs.

What is claimed is:

1. A heating apparatus for heating a calender roll prior to the calendar roll being inserted into a calendering apparatus, wherein the heating apparatus is characterized by:
   a frame structure upon which is mounted an idle roll, a drive roll, and heating means,
   wherein the calender roll to be heated in the heating apparatus contacts the idle roll and the drive roll and is adjacent to the heating means.

2. A heating apparatus in accordance with claim 1 wherein the heating apparatus is further characterized by the heating means being an induction heating coil that operates at a frequency range of 7 to 11 kHz.

3. A method for calendering a material with at least one calender roll in a calender being operated at a predetermined operating temperature, the method comprising the step of replacing the at least one calender roll from time to time with a replacement calender roll wherein the replacement calender roll is heated to a temperature at least equivalent to the predetermined operating temperature from a temperature lower than the predetermined operating temperature wherein the method comprises the further step of providing a heating apparatus located adjacent to the calender, the heating apparatus being characterized by:

a frame structure upon which is mounted an idle roll, a drive roll, and heating means, wherein the replacement calender roll to be heated in the heating apparatus contacts the idle roll and the drive roll and is adjacent to the heating means.

* * * * *